United States Patent
Teramachi et al.

[11] Patent Number: 6,094,819
[45] Date of Patent: *Aug. 1, 2000

[54] METHOD FOR MANUFACTURE OF RECTILINEAR GUIDE UNIT

[75] Inventors: Hiroshi Teramachi; Takeki Shirai, both of Tokyo, Japan

[73] Assignee: THK Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/973,543

[22] PCT Filed: May 6, 1997

[86] PCT No.: PCT/JP97/01523

§ 371 Date: Jun. 10, 1998

§ 102(e) Date: Jun. 10, 1998

[87] PCT Pub. No.: WO97/42423

PCT Pub. Date: Nov. 13, 1997

[30] Foreign Application Priority Data

May 7, 1996 [JP] Japan ................................. 8-112259

[51] Int. Cl.[7] ............................ B21D 53/10; B21K 1/10
[52] U.S. Cl. ................. 29/898.03; 29/527.1; 29/898.15; 264/273; 384/43; 384/44; 384/45
[58] Field of Search ......................... 29/898.03, 898.049, 29/898.06, 898.12, 898.15, 527.1, 527.4; 384/43, 44, 45; 264/273, 274, 275

[56] References Cited

U.S. PATENT DOCUMENTS

| | | | |
|---|---|---|---|
| 4,551,895 | 11/1985 | Teramachi | 29/148.4 R |
| 4,869,600 | 9/1989 | Tonogai | 384/43 |
| 4,902,143 | 2/1990 | Morita | 384/43 |
| 5,277,498 | 1/1994 | Kawaguchi | 384/45 |
| 5,373,635 | 12/1994 | Nonaka et al. | 29/898.1 |
| 5,380,099 | 1/1995 | Teramachi | 384/45 |
| 5,431,498 | 7/1995 | Lyon | 384/45 |
| 5,640,768 | 6/1997 | Teramachi | 29/898.03 |
| 5,716,139 | 2/1998 | Okamoto et al. | 384/45 |
| 5,755,516 | 5/1998 | Teramachi et al. | 384/45 |
| 5,829,883 | 11/1998 | Kawaguchi et al. | 384/45 |
| 5,851,073 | 12/1998 | Takeuchi | 384/45 |
| 5,951,168 | 9/1999 | Teramachi et al. | 384/45 |
| 6,012,848 | 1/2000 | Michioka et al. | 384/43 |

FOREIGN PATENT DOCUMENTS

| | | |
|---|---|---|
| 64-65325 | 3/1989 | Japan . |
| 2-142918 | 6/1990 | Japan . |
| 6-147222 | 5/1994 | Japan . |
| 7-317762 | 12/1995 | Japan . |

*Primary Examiner*—David P. Bryant
*Assistant Examiner*—Essama Omgba
*Attorney, Agent, or Firm*—Arent Fox Kintner Plotkin & Kahn

[57] ABSTRACT

The present invention relates to a method of manufacture of a slider of a rectilinear guide unit for guiding a movable body such as a work table of a machine tool, an industrial robot or the like by moving along an orbital rail arranged on a stationary section such as a bed, column or the like as it bears a load thereon. This method comprises a first step in which a metallic block main body as a core of the slider is machined to a predetermined shape and to form ball load rolling contact surfaces in the block main body and a second step in which the block main body machined in the previous step is inserted into a mold so as to allow a die-molding material to be padded thereon to thereby form an endless ball circulation path wherein in the first step, chamfered sections are formed on the corners of the block main body corresponding to a portion where the above-mentioned endless ball circulation path is formed.

3 Claims, 7 Drawing Sheets

METHOD FOR MANUFACTURE OF RECTILINEAR GUIDE UNIT

TECHNICAL FIELD

The present invention relates to a method of manufacture of a slider for a rectilinear guide unit for guiding a movable body such as a work table of a machine tool, an industrial robot and etc. while moving along an orbital rail arranged on a bed, column or the like, and more particularly to an improvement in a method in which a slider is formed by padding a die-molding material such as a synthetic resin to a metallic block main body.

BACKGROUND TECHNOLOGY

Conventionally, as a linear guide unit of the above type, there is known the one that has a structure comprising a orbital rail arranged on a stationary portion such as a bed and having ball rolling contact surfaces and a slider fastened to the orbital rail through a number of balls and movable along the rail which supports a movable body such as a table.

Further, the slider comprises a mobile block having ball load rolling contact surfaces opposing to the ball rolling contact surface of the orbital rail through the balls and ball return holes parallel to the ball load rolling contact surfaces and capable of moving along the orbital rail following the rolling of the balls, a pair of covers having change-direction paths for establishing communication between the ball load rolling contact surfaces and the ball return holes and ball retainers attached to the mobile block so as to prevent the falling of the balls from the ball load rolling contact surfaces and the end portions of the ball return holes are connected by the change-direction path when the covers are fixed to the front and rear end surfaces of the mobile block, respectively, thereby completing an endless circulation path for the balls in the slider.

In the case of the slider of the conventional rectilinear guide unit of the above-described structure, the process of drilling the ball return holes and the fixing of the ball retainers to the mobile block becomes necessary resulting in taking much time and labor for its manufacture so that the present applicant proposed a method of manufacture of the slider by making use of extrusion molding of a synthetic resin (refer to Japanese Unexamined Patent Publication No. 317762/1995).

More concretely, the above-proposed method is such that a synthetic resin is padded onto the metallic block main body having the above-mentioned load rolling contact surfaces subjected to cutting so that the ball return holes and the ball retainers are molded integral with the block main body and the ball guide sections on the side of the inner peripheral surface of each of the change-direction paths which have hitherto been formed in the covers are also molded on the end surfaces of the block main body to thereby manufacture the movable block. Besides the advantage of being able to manufacture a mobile block of a complicated shape in a simple manner, this proposed method has also such advantage that an endless ball circulation path provided with ball return holes, inner peripheral side ball guide sections and ball retainers formed continuous with one another can be formed with a synthetic resin thereby smoothing the circulation of the balls.

Now, where such endless ball circulation path is continuously formed with the synthetic resin, it is usual that the molten resin immediately after injection-molding solidifies as it contracts toward a direction parallel to the ball return holes but since such endless circulation path itself is so formed as to surround the block main body, in the case of the mobile block which has been subjected to molding, the synthetic resin forming the endless ball circulation path binds the block main body tightly and a tensile stress remains in the molded synthetic resin. Consequently, there has arisen the problem that when the block main body has front and rear corners near the boundary of the ball return holes and the inner peripheral side ball guide sections formed of the synthetic resin, the tensile stress concentrates on the corners causing the synthetic resin to crack thereby hindering the smooth rolling of the balls in the endless ball circulation path.

Further, there has also been the problem that when the block main body has corners formed of synthetic resin, the flow of the molten resin is hindered at the time of injection-molding and the fluidity of such molten synthetic resin becomes insufficient so that a weld line is generated in the synthetic resin forming the endless ball circulation path and the smooth rolling of the balls is hindered because of the presence of such weld line.

In addition, due to the fact that when the block main body has corners formed of synthetic resin, the flow of the molten resin is hindered due to the presence of these corners, the thickness of the synthetic resin at the ball return holes and the ball retaining sections tends to become non-uniform and it has not been able to avoid the generation of deformation of the ball return holes and the ball retaining sections in the cooling process after molding. Accordingly, there has been the problem that the smooth rolling of the balls is hindered because of this point, too.

Now, in order to allow the balls rolling in the endless ball circulation path to circulate smoothly along a predetermined track, it is necessary to prevent each of the balls rolling within the endless ball circulation path from unsteadily moving right and left by reducing the gap between the ball and the inner wall of the endless circulation path to a minimum. Accordingly, in order to secure the smooth movement of the slider with respect to the orbital rail, it is necessary to mold the endless ball circulation path to a predetermined dimensional accuracy without fail so that a special consideration has been required for padding a synthetic resin to the metallic block main body by injection-molding.

DISCLOSURE OF THE INVENTION

The present invention has been made to solve the above-described problems and an object of the invention is to provide a method of manufacture of a slider of a rectilinear guide unit in which when the slider of the rectilinear guide unit provided with ball return holes and ball retaining sections formed by padding a synthetic resin on a metallic block main body, no cracking generates in the synthetic resin forming an endless ball circulation path and ball return holes and ball retaining sections can be accurately formed.

In order to achieve the above-described object, a method of manufacture of a slider of a rectilinear guide unit according to the present invention comprises a first step in which a metallic block main body as a core of the slider is machined to a predetermined shape and ball load rolling contact surfaces are formed in the block main body and a second step in which the block main body formed in the first step is inserted into a mold to thereby mold a die-molding material to form an endless ball circulation path and characterized in that the first step includes forming chamfered sections at corners of the block main body at positions corresponding to the portion where the endless ball circulation path is formed.

According to the method of the present invention comprising the above-mentioned steps, since the first step includes the formation of the chamfered sections on the corners of the block main body at positions corresponding to the portion where the endless ball circulation path is formed, even when the die-molding material is padded to the block main body so as to surround the latter, the die-molding material forming the endless ball circulation path does not crack due to a tensile stress applied on the die-molding material after completion of molding to thereby secure the smoothness of rolling of the balls in the endless ball circulation path.

Further, by the formation of the chamfered sections on the corners of the block main body at a position corresponding to the endless ball circulation path, the molten die-molding material injected into the mold quickly spreads in the longitudinal direction of the block main body so that the thickness of the ball return holes and the ball retaining sections forming parts of the endless ball circulation path can be equalized with ease, the generation of deformation or distortion of these portions after the completion of molding can be controlled and the formation of a welding line of the die-molding material such as a synthetic resin in the endless ball circulation path can be prevented. Accordingly, it is possible to secure the smooth rolling of the balls within the endless ball circulation path from this point, too.

In the above case, the chamfered sections to be formed at the corners of the block main body may be planar or curved.

Further, according to the method of the present invention, when the molten die-molding material is injected into the mold in the second step, it is preferable that the molten die-molding material be injected from a direction parallel to the load rolling contact surface of the block main body because by so doing, the flow velocity of the molten die-molding material in the longitudinal direction of the block main body is improved to form the ball return holes and the ball retaining sections more accurately thereby smoothing the rolling of the balls.

It should be noted that in the inventions described in claims 1 through 3, whether or not the die-molding material is padded to the block main body to form ball retainers along both edges of the load rolling contact surface is a matter of design. In other word, the endless ball circulation path according to the present invention does not always include the ball retainers.

Further, the die-molding material referred to in the present invention also includes die-casting alloys and the like besides a synthetic resin material.

BRIEF DESCRIPTION OF THE DRAWINGS

FIG. 8 is a sectional view of the mobile block according to one embodiment of the present invention especially when a synthetic resin material is padded onto the block wherein

DESCRIPTION OF REFERENCE SYMBOLS

Figure 1:
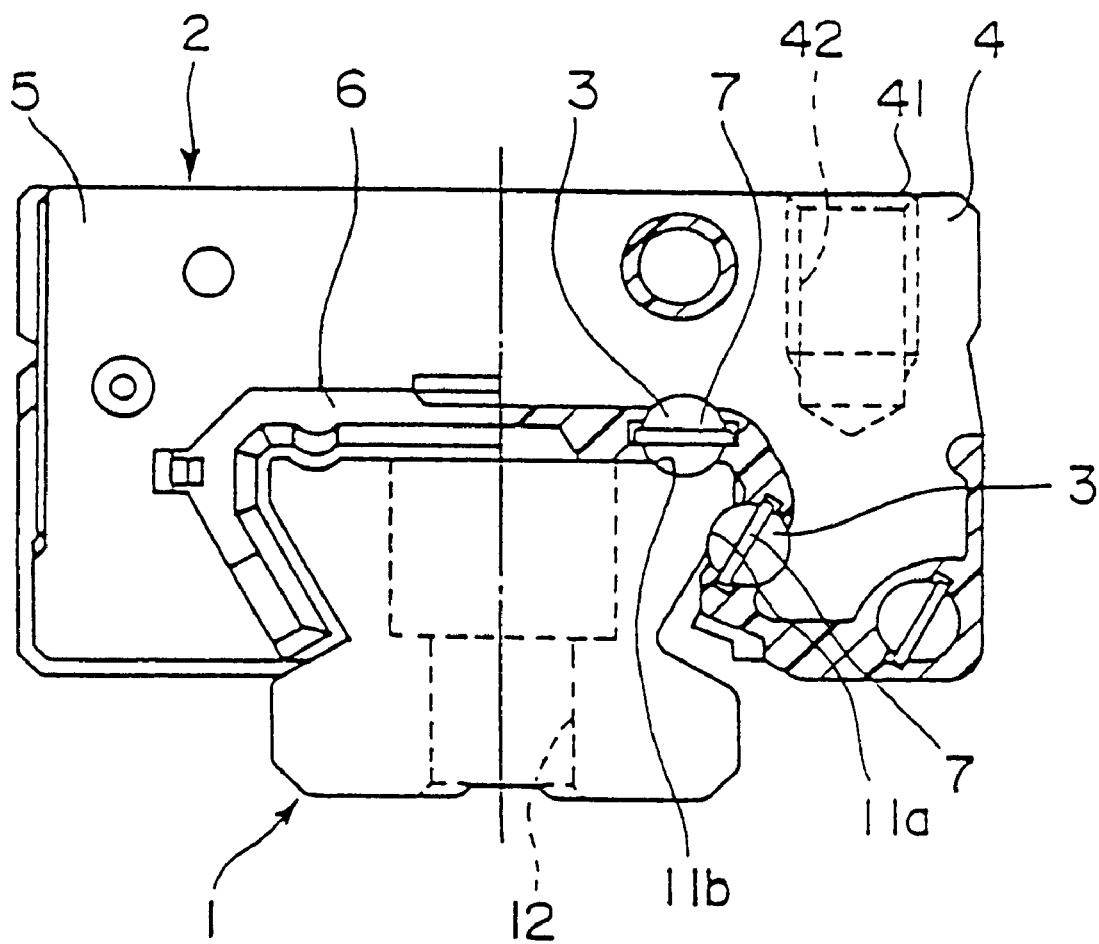
FIG. 1 is a front view (partly in section) of one embodiment of a rectilinear guide unit to be manufactured by a method of the present invention.

Reference numeral 1 designates an orbital rail, reference numeral 2 designates a slider; reference numeral 3 designates a ball, reference numeral 8 designates a block main body, reference numerals 43a and 43b designate ball load rolling surfaces, reference numerals 44a and 44b designate ball return holes, reference numeral 45 designates a ball retaining section; reference numerals 50a, 50b designate chamfered sections and reference numerals 61 and 62 designate dies.

BEST MODE FOR CARRYING OUT THE INVENTION

The method of manufacture of a slider of a rectilinear guide unit according to the present invention will now be described by referring to the accompanying drawings.

Figure 2:
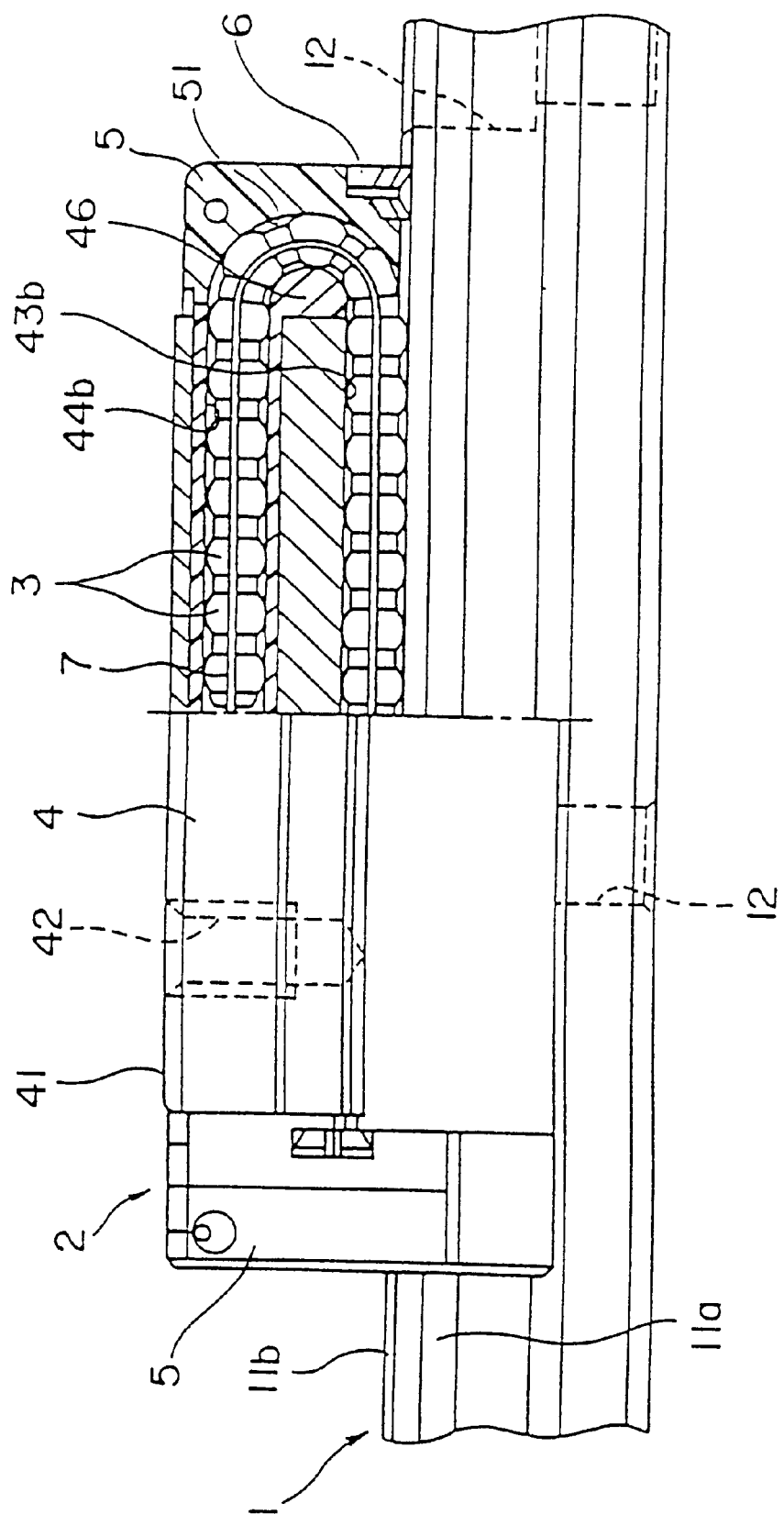
FIG. 2 is a side view (partly in section) of one embodiment of the linear guide shown in FIG. 1.

FIGS. 1 and 2 show one embodiment of the rectilinear guide unit in which the slider manufactured by the method of the present invention is combined with an orbital rail. In these figures, reference numeral 1 designates an orbital rail arranged on a stationary portion such as a bed of a rectilinear guide unit, reference numeral 2 designates the slider for guiding a movable body such as a table and reference numeral 3 designates balls endlessly circulating within the slider 2 while rolling between the orbital rail 1 and the slider 2 as it bears a load thereon.

First, the orbital rail 1 is substantially rectangular in section and a total of four (4) lines of ball rolling contact surfaces 11a and 11b on which the balls 3 roll are formed along the longitudinal direction. These ball rolling contact surfaces 11a and 11b are formed on both side surfaces and both edges of the upper surface of the orbital rail 1, respectively, such that the ball rolling contact surface 11a is formed downward at an angle of 30° with respect to the horizontal direction in FIG. 1 and the ball rolling contact surface 11b is formed upright. Further, the orbital rail 1 is provided with a plurality of bolt fitting holes 12 at suitable intervals in the longitudinal direction thereof so that the orbital rail 1 is fixed to the stationary portion of the machine tool or the like by means of fixing bolts (not shown) to be inserted into these holes 12, respectively.

On the other hand, the above-mentioned slider 2 comprises a mobile block 4 having a fitting surface 41 for a movable body such as a table and a plurality of tap holes 42 into which movable body fixing bolts are inserted and a pair of covers 5 which are fixed to front and rear end surfaces of the mobile block 4 whereby when the covers 5 are fixed to the mobile block 4, the slider can be provided therein with an endless circulation path for the balls 3. Further, to each of the covers 5, there is attached a seal member 6 coming into sliding contact with the orbital rail 1 so that dust and the like adhered to the orbital rail 1 are prevented from entering into the slider 2 following the movement of the slider 2.

Figure 3:
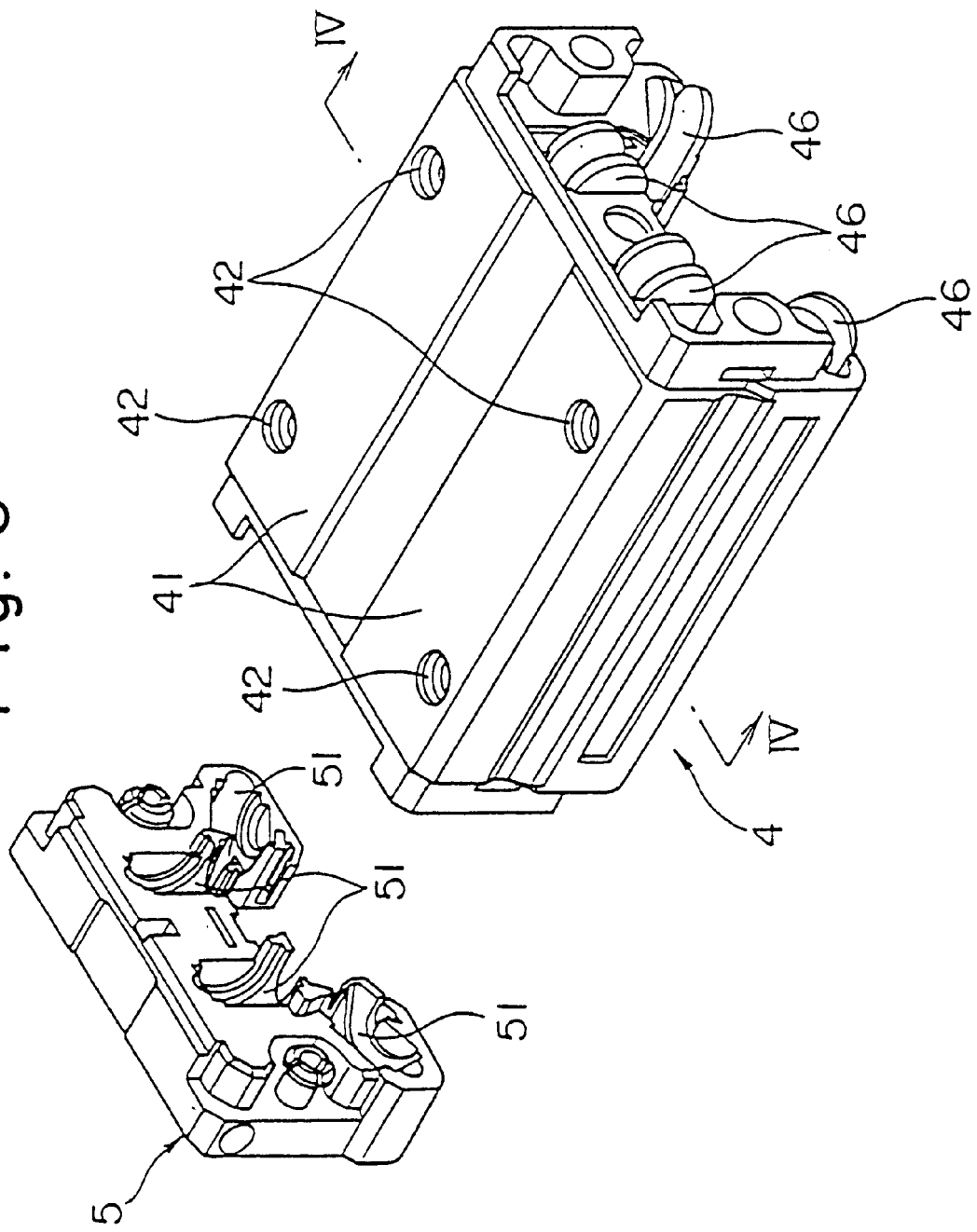
FIG. 3 is an exploded perspective view of a slider according to one embodiment of the present invention.
Figure 4:
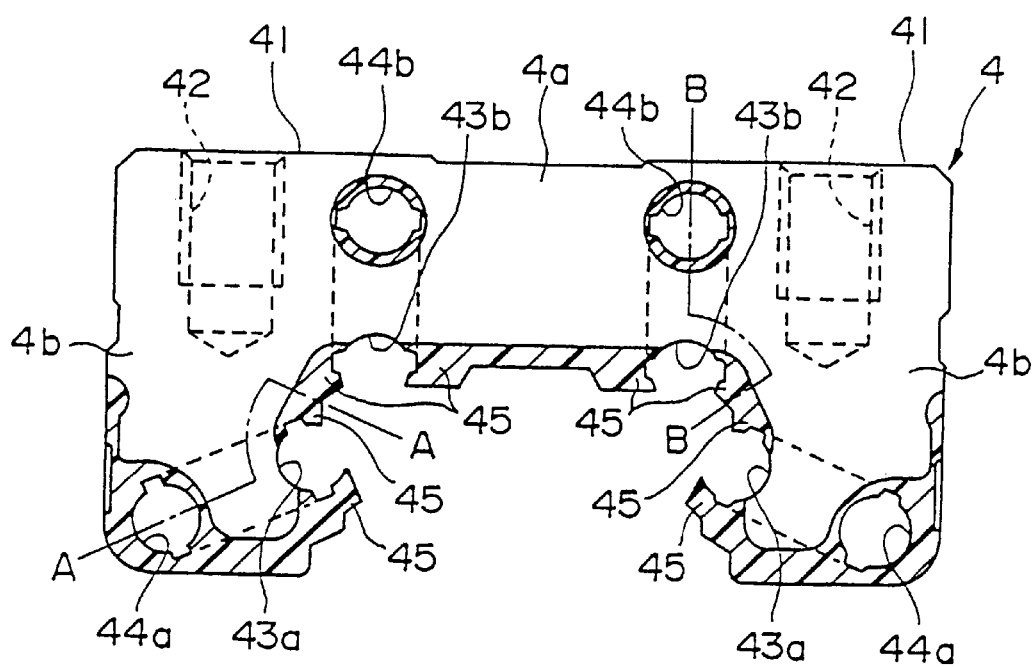
FIG. 4 is a sectional view of a mobile block forming a slider shown in FIG. 3.

As shown in FIGS. 3 and 4, the mobile block 4 is substantially in the shape of a saddle having a horizontal section 4a on which the fitting surface 41 is formed and a pair of skirts 4b drooping from the horizontal section 4a and on the lower surface of the horizontal section 4a and the inner surface of each of the skirts 4b there are formed a total of four load rolling contact surfaces 43a and 43b, respectively. Further, on the horizontal section 4a and each of the skirts 4b, there are provided ball return holes 44a and 44b, respectively, in correspondence to the load rolling contact surfaces 43a and 43b so that the load rolling contact surfaces 43a and 43b and the ball return holes 44a and 44b corresponding thereto are connected by ball change-direction paths 51 formed in each of the covers 5 resulting in the formation of an endless circulation path for the balls 3.

With the above structure, each of the balls 3 which have borne a load between the ball rolling contact surfaces 11a and 11b of the orbital rail 1 and the load rolling contact surfaces 43a and 43b of the mobile block 4 is released from the load when it has rolled on the load rolling contact surfaces 43a and 43b following the movement of the slider 2, so that the ball 3 enters the change-direction path 51 of one of the pair of the covers 5 and moves toward a direction reverse to the direction of rolling of the ball on the load rolling contact surfaces 43a and 43b in a no-load condition so as to roll through the ball return holes 44a and 44b of the mobile block 4. Further, each of the balls 3 which has rolled through the ball return holes 44a and 44b enters again between the orbital rail 1 and the mobile block 4 through the change-direction path 51 of the other cover 5 and rolls on the load rolling contact surfaces 43a and 43b while it bears a load.

Further, on both sides of each of the load rolling contact surfaces 43a and 43b there are formed ball retaining sections 45 so as to hang over the load rolling contact surfaces 43a and 43b and when the slider 2 is removed from the orbital rail 1, the balls 3 on the load rolling contact surfaces 43a and 43b are prevented from falling down from the slider 2.

Further, in the instant embodiment, from the point of view of preventing as much as possible the abrasion of the balls by keeping the balls out of contact with one another within the endless ball circulation path, the balls 3 are fitted into a belt-like cage 7 made of a synthetic resin to thereby form a ball chain and such ball chain is assembled into the endless ball circulation path. For this purpose, each of the ball return holes 44a and 44b and each of the ball retaining sections 45 are provided with grooves for supporting both edges of the above-mentioned belt-like cage 7 which circulates through the endless ball circulating path together with the balls 3.

In addition, as shown in FIG. 3, on the front and rear end surfaces of the mobile block 4 there are provided semicircular ball guides 46, respectively, so as to guide each of the balls 3 coming into, and getting away from, the ball return holes 44a and 44b, side by side with the change-direction paths 51 of the pair of covers 5.

The mobile block 4 is formed by padding a synthetic resin to the metallic block main body 8 by an injection-molding process such that the portions such as the movable body fitting surface 41 and the load rolling contact surfaces 43a and 43b for the balls 3 where a mechanical strength is required are formed in the block main body 8 while the portions such as the ball return holes 44a, 44b, the ball retaining sections 45 and the ball guide sections 46 where the mechanical strength is not deemed important are made of a synthetic resin so as to make the weight of the mobile block 4 as small as possible.

Figure 5:
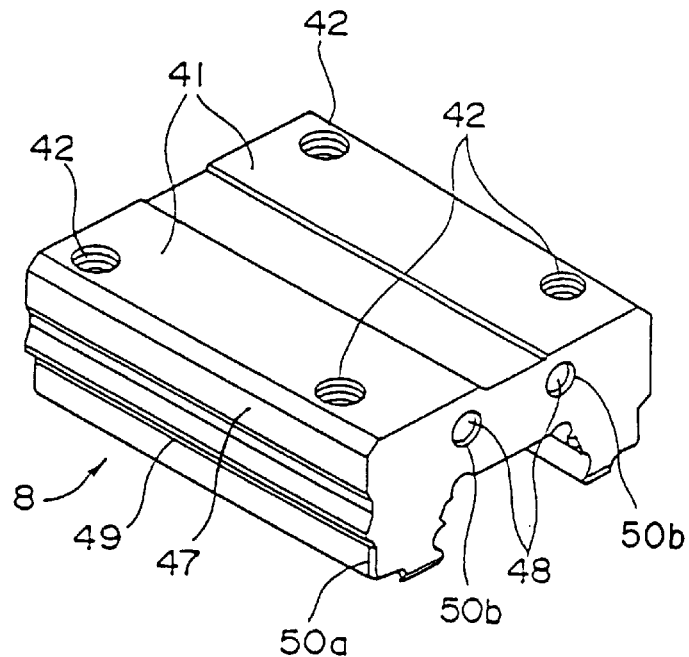
FIG. 5 is a perspective view of a block main body as a core of the mobile block according to one embodiment of the present invention.
Figure 6:
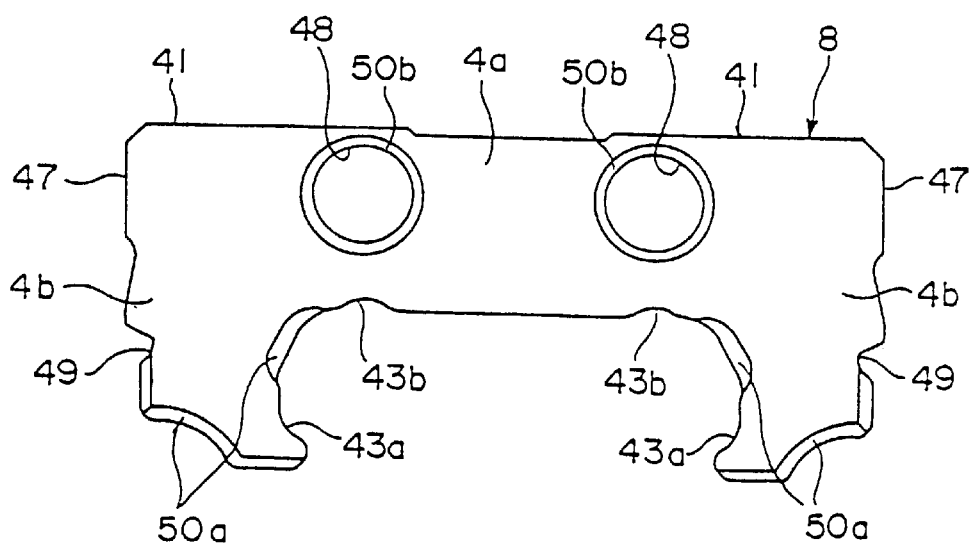
FIG. 6 is a front view of the block main body shown in FIG. 5.

FIG. 5 is a front view of the block main body 8 before it is padded with a synthetic resin. Such block main body 8 is finished in such a manner that the horizontal section 4a and the skirts 4b are roughly formed by drawing, then the movable body fitting surfaces 41, reference side surfaces 47 and the load rolling contact surfaces 43a and 43b are formed to have a predetermined degree of accuracy and through holes 48 as prepared holes for the ball return holes 44b are formed by drilling. Further, in the above-mentioned drawing process, in order to improve the adhesion of the synthetic resin to be padded to the block main body 8, concave portions 49 serving as resin reservoirs are formed on the outer sides of the skirts 4b, respectively.

In the above case, in view of the fact that the synthetic resin is padded around the skirts 4b of the block main body 8 at the time of injection molding to be performed later, substantially curved chamfered sections 50a are formed at the corners of the front and rear end surfaces of each of the skirts 4b with the exception of the portions where the load rolling contact surfaces 43a and 43b are formed so that the molten synthetic resin at the time of injection molding is made to flow smoothly.

Next, the process of padding a synthetic resin, by injection-molding, to the block main body 8 finished to a predetermined shape as described above will be explained.

This injection molding is performed by the so called insert molding in which the finished block main body 8 is arranged within a mold so as to act as a core whereby the synthetic resin is padded only to a predetermined portion of the block main body 8 to thereby form the above-mentioned ball return holes 44a and 44b, the ball retaining sections 45, the ball guide sections 46 and etc.

Figure 7:
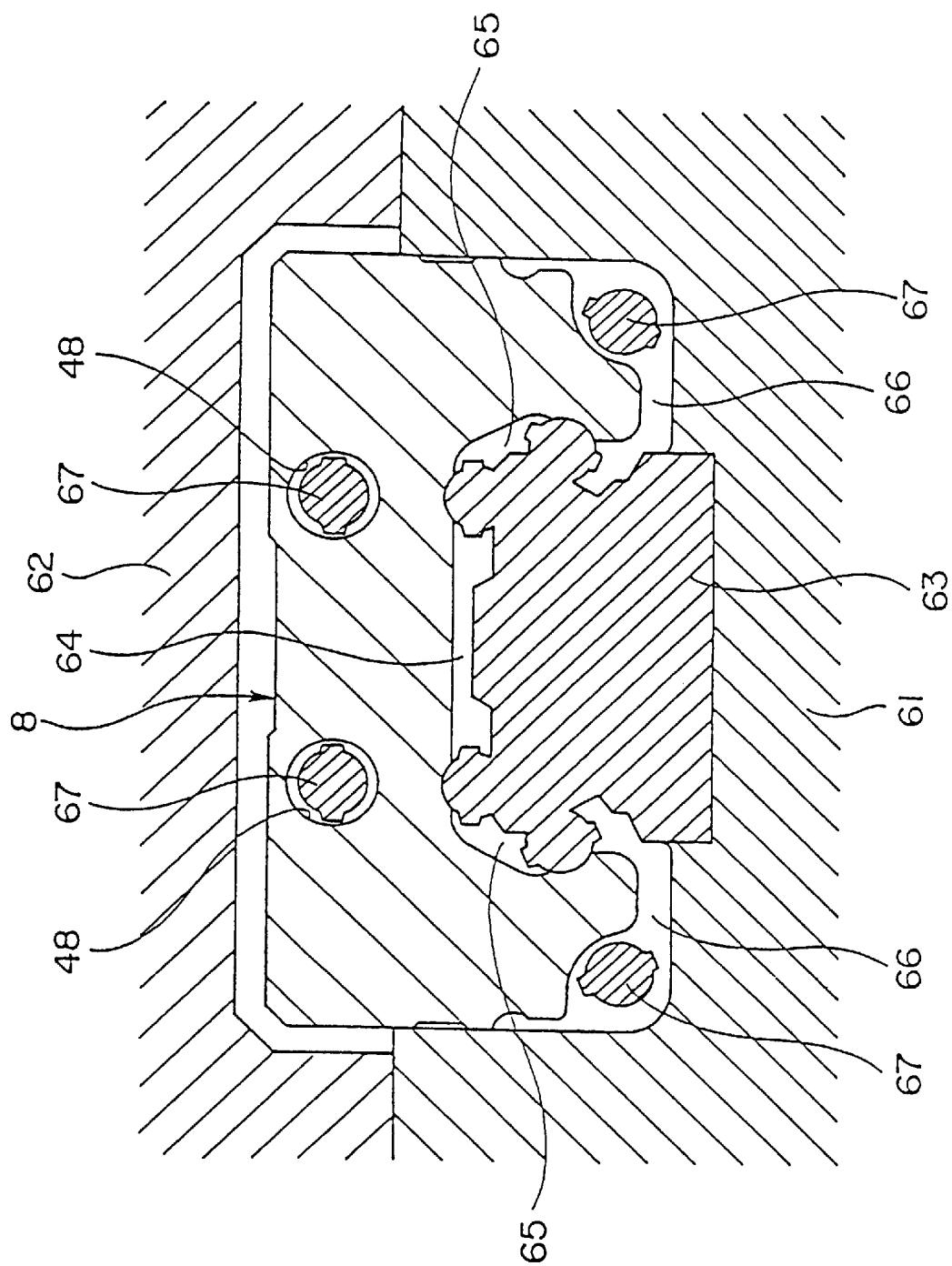
FIG. 7 is a sectional view of the block main body when the block main body is inserted into a mold.

FIG. 7 is a sectional view of the block main body 8 inserted into a mold comprising dies 61 and 62. The die 61 has a support 63 erected thereon so as to fix the block main body 8 thereto and when the block main body 8 is caused to fit about the support 63 from the direction of axis of the block main body 8 (i.e., the vertical direction in FIG. 7), the block main body 8 is positioned between the dies 61 and 62 so that cavities 64 and 65 corresponding to the ball retaining sections 45 of the mobile body 4 are formed between the block main body 8 and the support 63 and at the same time, cavities 66 for forming the ball return holes 44a are formed between the skirts 4b and the die 61. Further, into the through holes 48 of the block main body 8 and into the cavities 66 there are inserted rod-shaped die members 67 each having a sectional configuration coinciding with the shape of the ball return holes 44a and 44b so that when the molten synthetic resin is filled into these through holes 48 and the cavities 66, the ball return holes 44a and 44b are formed.

Further, the die 61 is in contact with the lower edges of the reference side surfaces 47 of the block main body 8 whereby the molten synthetic resin to be filled into the cavities 66 is cut well to thereby prevent the synthetic resin from covering the reference side surfaces 47.

In the instant embodiment, the filling of the molten synthetic resin into the cavities 64, 65 and 66 is performed from a direction parallel to the load rolling contact surfaces 43a and 43b formed in the block main body 8 so that the molten synthetic resin flows quickly up to the innermost portions of the cavities 64, 65 and 66 which extend long toward that direction.

Thus, after the block main body 8 has been inserted between the dies 61 and 62, when the molten synthetic resin is filled into the cavities 64, 65 and 66 so as to be padded on the block main body 8, the mobile block 4 shown in FIG. 3 is completed.

Figure 8A:
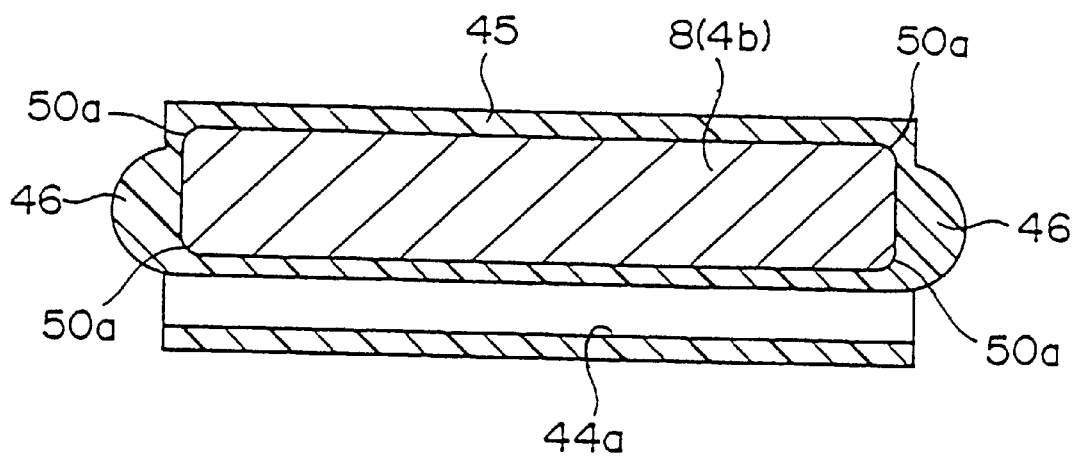
FIG. 8(a) is a sectional view taken along the A—A line of FIG. 4
Figure 8B:
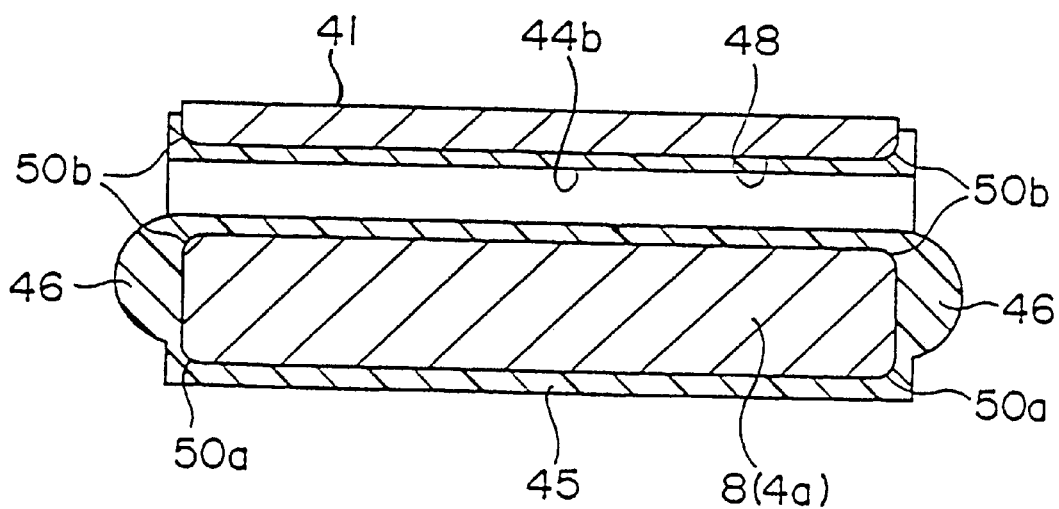
FIG. 8(b) is a sectional view taken along the B—B line of FIG. 4.

FIG. 8 is a sectional view of the mobile block 4 finished by the above-described process especially in a state in which the mobile block 4 is padded with a synthetic resin wherein FIG. 8(a) is a sectional view of the skirt 4b when taken along the A—A line of FIG. 4 and FIG. 8(b) is a sectional view of the horizontal section 4a when taken along the B—B line of FIG. 4. As will be clear from these figures, chamfered sections 50a are formed on the front and rear end surfaces of the skirt 4b of the block main body 8 and chamfered sections 50b are formed also at the opening edges of the through holes 48 formed in the horizontal section 4a so that when the molten synthetic resin is filled into the mold in the above-described insert-molding process, the molten synthetic resin spreads quickly around the skirts 4b and flows inside the through holes 48.

Consequently, the equalization of thickness of the synthetic resin forming the ball return holes 44a, 44b and the ball retaining sections 45 is promoted so that it is possible to prevent as much as possible the deformation or distortion of the ball return holes 44a and 44b and the ball retaining sections 45 at the time of solidification of the contracted synthetic resin thereby increasing the dimensional accuracy of the endless ball circulation path formed by these elements. Further, it is also possible to prevent the generation of a weld line of the synthetic resin within such endless circulation path. As a result, the slider 2 assembled by using the mobile block 4 manufactured by the above-described process allows the balls 3 to smoothly roll within the endless ball circulation path and the slider 2 itself can smoothly move on the orbital rail 1.

Further, since the chamfered sections 50a are formed on the front and rear end surfaces of the skirts 4b of the block main body 8, respectively, even when the synthetic resin which forms the endless ball circulation path by being padded around each of the skirts 4b contracts after the completion of the injection-molding process, there is no possibility of the synthetic resin getting cracked and also due to this advantage, the rolling of the balls 3 in the endless ball circulation path can be made smooth.

INDUSTRIAL APPLICABILITY

As described above, according to the method of manufacture of the slider of the rectilinear guide unit of the present invention, even when the endless circulation path for the balls is formed by padding a die-molding material around the block main body, since the corners of the block main body corresponding to the endless ball circulation path are substantially curved, the endless ball circulation path made of the die-molding material does not crack so that it is possible to secure the smooth endless circulation of the balls and hence the smooth movement of the slider.

Further, by making the corners of the block main body substantially curved, the molten die-molding material flows quickly around the block main body at the time of molding and the equalization of thickness of the ball return holes and the ball retaining sections forming the endless ball circulation path is promoted. Consequently, the deformation or distortion of the ball return holes or the ball retaining sections is prevented to thereby increase the dimensional accuracy of the endless ball circulation path so that it is possible to secure the smooth circulation of the balls and hence the smooth movement of the slider with respect to this point, too.

What is claimed is:

1. A method of manufacture of a slider of a rectilinear guide unit, which method comprising:

machining a metallic block main body as a core of the slider to a predetermined shape having ball load rolling contact surfaces in the block main body:

positioning the block main body into a mold; and molding a body portion onto the block main body for forming an endless ball circulation path using a die-molding material;

further comprising during said machining, forming chamfered sections on front and rear edge corners of the block main body corresponding to a portion where the endless ball circulation path is formed during the molding, said chamfered sections being covered by the die-molding material following the molding, whereby smooth flow of the die-molding material occurs during the molding.

2. The method according to claim 1, wherein, in said molding, a molten die-molding material is injected from a direction parallel to the ball load rolling contact surfaces of the block main body inserted into a mold.

3. In a slider for a rectilinear guide unit including a metallic block main body having ball load rolling contact surfaces and a molded body portion on the block main body for endlessly circulating balls so that an endless ball circulation path is formed by said molding, the improvement wherein molding-flow-smoothing chamfered sections are formed on front and rear corners of the block main body corresponding to a portion where the endless ball circulation path is formed and are covered by said molded body portion.

* * * * *